United States Patent
Liu et al.

(10) Patent No.: US 8,207,661 B2
(45) Date of Patent: Jun. 26, 2012

(54) BORATE PHOSPHOR AND WHITE LIGHT ILLUMINATION DEVICE UTILIZING THE SAME

(75) Inventors: Wei-Jen Liu, Taoyuan (TW); Yi-Chen Chiu, Hsinchu (TW); Chien-Yueh Tung, Taipei (TW); Yao-Tsung Yeh, Taoyuan (TW); Shyue-Ming Jang, Hsinchu (TW); Teng-Ming Chen, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 1047 days.

(21) Appl. No.: 12/132,612

(22) Filed: Jun. 4, 2008

(65) Prior Publication Data

US 2009/0236970 A1 Sep. 24, 2009

(30) Foreign Application Priority Data

Mar. 20, 2008 (TW) ................ 97109808 A

(51) Int. Cl.
  H01J 1/62 (2006.01)
  H01J 63/04 (2006.01)
  C09K 11/02 (2006.01)
  C09K 11/08 (2006.01)
  C09K 11/77 (2006.01)

(52) U.S. Cl. ................. 313/503; 252/301.4 R
(58) Field of Classification Search .......... 252/301.4 R; 313/503
See application file for complete search history.

(56) References Cited

U.S. PATENT DOCUMENTS

| | | | |
|---|---|---|---|
| 4,202,794 A * | 5/1980 | Lehmann | 252/301.4 R |
| 4,233,538 A * | 11/1980 | van de Spijker et al. | 313/486 |
| 5,132,043 A | 7/1992 | Deboer | |
| 5,376,303 A * | 12/1994 | Royce et al. | 252/301.4 R |
| 5,665,660 A * | 9/1997 | Yamawaki et al. | 501/32 |
| 5,885,483 A * | 3/1999 | Hao et al. | 252/301.4 R |
| 6,007,741 A | 12/1999 | Hunt, Jr. et al. | |
| 6,085,971 A | 7/2000 | Tews et al. | |
| 6,165,385 A | 12/2000 | Rao et al. | |
| 6,252,254 B1 | 6/2001 | Soules et al. | |
| 6,407,498 B1 | 6/2002 | Justel et al. | |
| 6,905,636 B2 | 6/2005 | Yuan et al. | |
| 6,943,380 B2 | 9/2005 | Ota et al. | |
| 7,056,451 B2 | 6/2006 | Manivannan et al. | |
| 7,060,202 B2 | 6/2006 | Shi et al. | |
| 7,088,038 B2 | 8/2006 | Srivastava et al. | |
| 7,122,128 B2 | 10/2006 | Comanzo et al. | |
| 7,128,849 B2 | 10/2006 | Setlur et al. | |
| 7,176,501 B2 | 2/2007 | Lee et al. | |
| 7,274,045 B2 | 9/2007 | Chandran et al. | |
| 7,959,827 B2 * | 6/2011 | Comanzo et al. | 252/301.4 R |
| 2005/0094620 A1 | 5/2005 | Calcev | |
| 2006/0011890 A1 | 1/2006 | Isobe | |
| 2006/0208270 A1 | 9/2006 | Chandran et al. | |

OTHER PUBLICATIONS

Examination opinion issued by the Taiwan Intellectual Property Office on Oct. 24, 2011, for the above-referenced application's counterpart application in Taiwan (Application No. 097109808 filed Mar. 20, 2008).

* cited by examiner

*Primary Examiner* — Carol M Koslow
*Assistant Examiner* — Matthew Hoban
(74) *Attorney, Agent, or Firm* — Pai Patent & Trademark Law Firm; Chao-Chang David Pai

(57) ABSTRACT

The invention provides borate phosphors composed of $Ca_{1-x}AlBO_4:M_x$, wherein M is $Pr^{3+}$, $Nd^{3+}$, $Eu^{3+}$, $Eu^{2+}$, $Gd^{3+}$, $Tb^{3+}$, $Ce^{3+}$, $Dy^{3+}$, $Yb^{2+}$, $Er^{3+}$, $Sc^{3+}$, $Mn^{2+}$, $Zn^{2+}$, or combinations thereof, and $0 \leq x \leq 0.3$. The invention also provides borate phosphors composed of $Zn_{1-x-y}B_2O_4:Eu^{3+}_x, Bi^{3+}_y$, wherein $0 \leq x \leq 0.6$ and $0 \leq y \leq 0.6$. The borate phosphors emit visible light under the excitation of ultraviolet light or blue light, and may be further collocated with different colored phosphors to provide a white light illumination device.

11 Claims, 20 Drawing Sheets

BORATE PHOSPHOR AND WHITE LIGHT ILLUMINATION DEVICE UTILIZING THE SAME

CROSS REFERENCE TO RELATED APPLICATIONS

This application claims priority of Taiwan Patent Application No. 097109808, filed on Mar. 20, 2008, the entirety of which is incorporated by reference herein.

BACKGROUND OF THE INVENTION

1. Field of the Invention

The present invention relates to a borate phosphor, and in particular relates to a white light illumination device utilizing the same.

2. Description of the Related Art

Commercially available white light illumination devices such as light emitting diodes (hereinafter LED), have gradually replaced conventional tungsten lamps or fluorescent lamps due to high luminescence efficiency and eco-friendliness. For white LEDs, the phosphor composition located within, is a critical factor determining luminescence efficiency, color rendering, color temperature, and lifespan of white LEDs.

In general, the excitation light source of conventional phosphors is a short wavelength ultraviolet light (UV) such as 147 nm, 172 nm, 185 nm, or 254 nm. The phosphors excited by the short wavelength UV have high light absorption and light transfer efficiency. Compared with phosphors excited by short wavelength UV, phosphors excited by long wavelength UV or visible light (350-470 nm) are rare.

In the field, conventional host materials in the phosphor are sulfides, nitrides, or oxides such as silicates or aluminates. Sulfides have high light transfer efficiency, but are unstable and easily degraded by moisture or oxygen. Meanwhile, nitrides are stable, but they are difficult to manufacture as nitrides require a high temperature/pressure condition, thus increasing costs and decreasing production yields. Compared the described phosphors, the borate phosphor of the invention has advantages such as low preparation temperature, high optical stability, and high chemical stability. Accompanied with blue-light or UV LED or laser diode, the borate phosphor may emit visible light. Furthermore, the borate phosphor may collocate with other suitable phosphors to emit different colors to complete a white light illumination device.

SUMMARY OF THE INVENTION

The invention provides a borate phosphor having a formula: $Ca_{1-x}AlBO_4:M_x$, wherein M is $Pr^{3+}$, $Nd^{3+}$, $Eu^{3+}$, $Eu^{2+}$, $Gd^{3+}$, $Tb^{3+}$, $Ce^{3+}$, $Dy^{3+}$, $Yb^{2+}$, $Er^{3+}$, $Sc^{3+}$, $Mn^{2+}$, $Zn^{2+}$, or combinations thereof, and $0 \leq x \leq 0.3$.

The invention also provides a borate phosphor having a formula: $Zn_{1-x-y}B_2O_4:Eu^{3+}_x$, $Bi^{3+}_y$, wherein $0 \leq x \leq 0.6$ and $0 \leq y \leq 0.6$.

The invention further provides a white light illumination device comprising the borate phosphor as described as above and an excitation light source, wherein the excitation light source emits 200-400 nm UV or 400-470 nm blue light.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
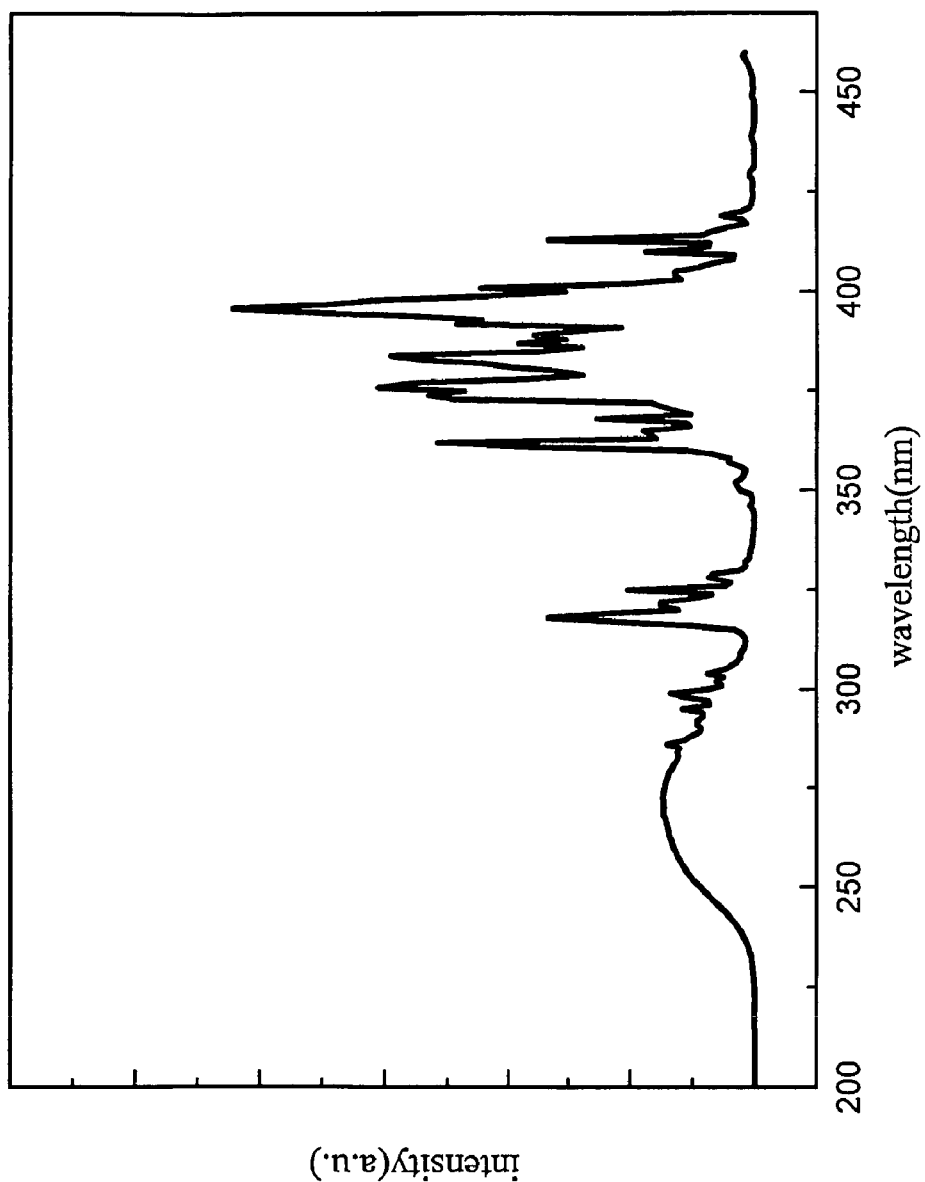
FIG. 1 is a photoluminescence excitation spectrum of the borate phosphor $Ca_{0.93}AlBO_4:Eu^{3+}_{0.07}$ in one example of the invention.

The following description is of the best-contemplated mode of carrying out the invention. This description is made for the purpose of illustrating the general principles of the invention and should not be taken in a limiting sense. The scope of the invention is best determined by reference to the appended claims.

The invention provides a borate phosphor, having a formula as $Ca_{1-x}AlBO_4:M_x$, wherein M is $Pr^{3+}$, $Nd^{3+}$, $Eu^{3+}$, $Eu^{2+}$, $Gd^{3+}$, $Tb^{3+}$, $Ce^{3+}$, $Dy^{3+}$, $Yb^{2+}$, $Er^{3+}$, $Sc^{3+}$, $Mn^{2+}$, $Zn^{2+}$, or combinations thereof, and $0 \leq x \leq 0.3$. For example, the borate phosphors can be $Ca_{1-x}AlBO_4:Eu^{3+}{}_x$, $Ca_{1-x}AlBO_4:Tb^{3+}{}_x$, $Ca_{1-x}AlBO_4:Mn^{2+}{}_x$, $Ca_{1-x}AlBO_4:Eu^{2+}{}_x$, or $Ca_{1-x}AlBO_4:Ce^{3+}{}_x$.

The invention provides a borate phosphor having a formula as $Zn_{1-x-y}B_2O_4:Eu^{3+}{}_x$, $Bi^{3+}{}_y$, wherein $0 \leq x \leq 0.6$ and $0 \leq y \leq 0.6$. When x is zero and only $Bi^{3+}$ is doped, the borate is a blue phosphor. When y is zero and only $Eu^{3+}$ is doped, the borate is a red phosphor. In one embodiment, the borate doped with $Eu^{3+}$ and $Bi^{3+}$ emits brighter red light than the borate doped with only $Eu^{3+}$, because the borate doped with $Eu^{3+}$ is not only directly excited by the excitation light source but also indirectly excited by the blue light from the borate doped with $Bi^{3+}$.

After excited by blue light (400 nm to 470 nm) or UV (200 nm to 400 nm), the borate phosphors may emit visible lights with different wavelength. In addition, the excitation light source of the borate phosphors can be a light-emitting diode or a laser diode.

The method for preparing the described aluminosilicate is by solid-state reaction. First, the appropriate stoichiometry of reagents was weighted according to the element molar ratio of the resulting borates. The reagents containing Ca can be oxide (CaO) or carbonate ($CaCO_3$). The reagents containing Al can be oxide such as $\gamma$-$Al_2O_3$. The reagents containing $Pr^{3+}$, $Nd^{3+}$, $Bi^{3+}$, $Eu^{3+}$, $Eu^{2+}$, $Gd^{3+}$, $Tb^{3+}$, $Ce^{3+}$, $Dy^{3+}$, $Yb^{2+}$, $Er^{3+}$, $Sc^{3+}$, $Mn^{2+}$, $Zn^{2+}$, or combinations thereof can be chlorides such as $EuCl_2$ and the likes, fluorides such as $CeF_3$ and the likes, oxides such as $Mn_3O_4$, $MnO_2$, $Eu_2O_3$, $Bi_2O_3$, $CeO_2$, and the likes, carbonates such as $MnCO_3$ and the likes, acetates such as $Mn(CH_3COO)_2$ and the likes, and nitrates such as $Ce(NO_3)_3$ and the likes. The boron containing reagents includes oxides such as boron oxide ($B_2O_3$) or boric acid ($H_3BO_3$). The described reagents were evenly mixed and grinded, and charged in a double-crucible. The double-crucible was then stuffed by graphite, and then heated in a high temperature furnace. After sintering at 700-1000° C. for several hours, washing, and heat drying, the described borate phosphors were prepared.

In one embodiment, the borate phosphor emits red light after being excited by blue light or UV light. In this embodiment, the borate phosphors may collocate with a UV excitable blue phosphor and a UV or blue light excitable green phosphor. Arranged with a UV excitation light source such as light-emitting diode or laser diode, a white light emitting diode or white laser diode is completed. The described blue phosphor includes $BaMgAl_{10}O_{17}:Eu^{2+}$, $(Ba,Sr,Ca)_5(PO_4)_3(F, Cl, Br, OH):Eu^{2+}$, $2SrO*0.84P_2O_5*0.16B_2O_3:Eu^{2+}$, $Sr_2Si_3O_8*2SrCl_2:Eu^{2+}$, $(Mg, Ca, Sr, Ba, Zn)_3B_2O_6:Eu^{2+}$, and other suitable blue phosphors. The described green phosphor includes $BaMgAl_{10}O_{17}:Eu^{2+}$, $Mn^{2+}$, $SrGa_2S_4:Eu^{2+}$, $(Ca,Sr,Ba)Al_2O_4:Eu^{2+}$, $Mn^{2+}$, $(Ca,Sr,Ba)_4Al_{14}O_{25}:Eu^{2+}$, $Ca_8Mg(SiO_4)_4Cl_2:Eu^{2+},Mn^{2+}$, and other suitable green phosphors. If the blue, green, and red phosphors are UV excitable, the blue, green, and red phosphors are directly excited by the excitation light source. If the green and red phosphors are blue light excitable, the red and green phosphors are indirectly excited by blue light from the blue phosphor. The combination and ratio of blue, green and red phosphors are optional in different applications of direct or indirect excitation.

For the white light illumination device such as described, a white light emitting diode or white laser diode, and the red/green/blue phosphors can be evenly mixed in preferable ratio and dispersed in an optical gel. The optical gel containing the phosphors may further seal a near UV excitation light source such as a chip of a light emitting diode or a laser diode. Note that if UV is selected as the excitation light source, a UV filter or another UV insulator should be arranged externally from the white light illumination device to protect user's eyes and skin.

EXAMPLES

Example 1

Figure 2:
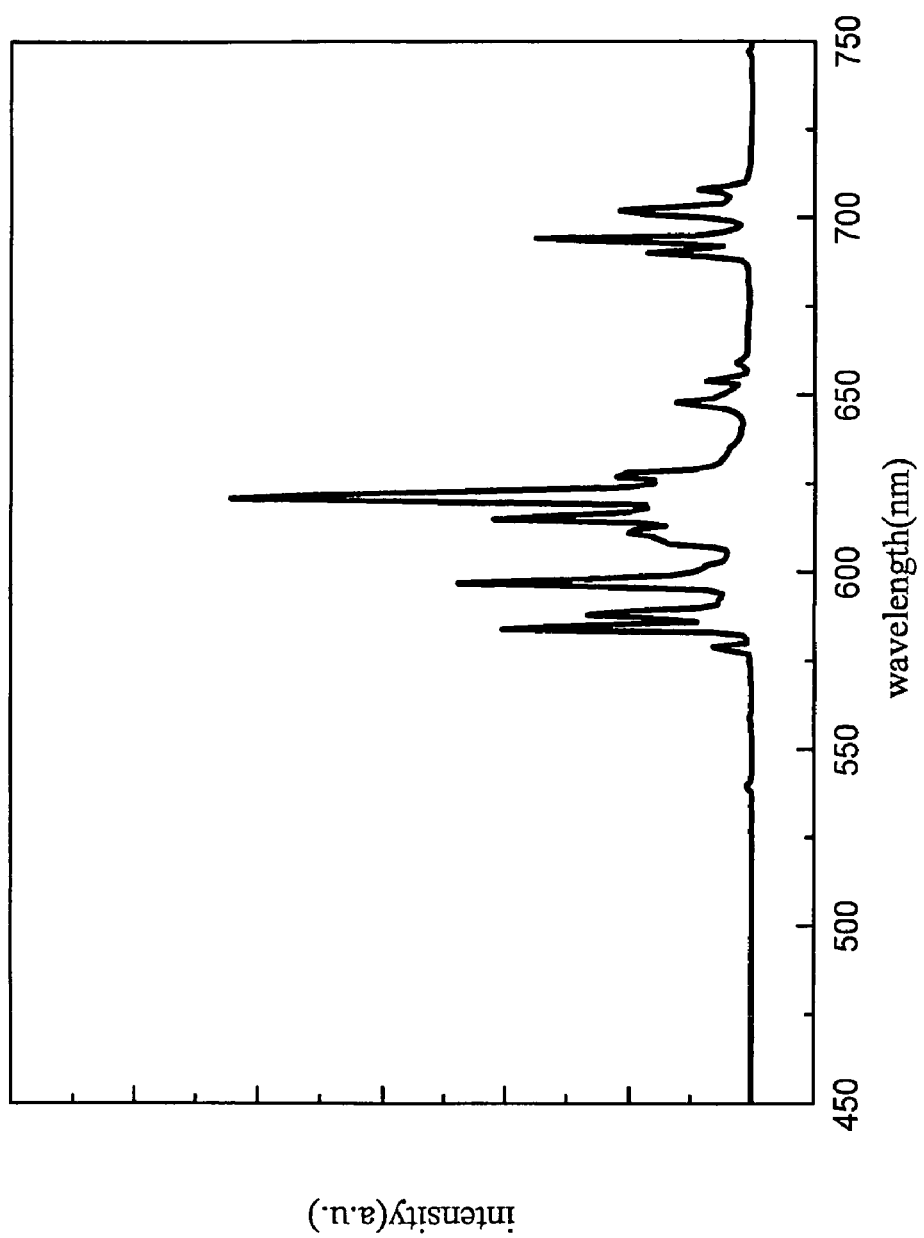
FIG. 2 is a photoluminescence emission spectrum of the borate phosphor $Ca_{0.93}AlBO_4:Eu^{3+}_{0.07}$ in one example of the invention.

0.93 mol of $CaCO_3$ (0.4654 g, FW=100.086, commercially available from ALDRICH, 99.99%), 1 mol of $Al_2O_3$ (0.2549 g, FW=101.961, commercially available from ALDRICH, 99.99%), 1 mol of $B_2O_3$ (0.1740 g, FW=69.619, commercially available from STREM, >99.9%), and 0.035 mol of $Eu_2O_3$ (0.0616 g, FW=351.917, commercially available from ALDRICH, 99.9%) were weighted, evenly mixed and grinded, and charged in a double-crucible. The double-crucible was then stuffed by graphite, and then heated in a high temperature furnace. After sintering in air at 1000° C. for about 10 hours, washing, filtering, and heat drying, pure phase of the borate phosphor $Ca_{0.93}AlBO_4:Eu^{3+}{}_{0.07}$ was prepared. The photoluminescence excitation and emission spectra of the described product are shown in FIGS. 1 and 2, respectively. The major peak of the excitation band is 396 nm, the major peak of the emission band is 621 nm, and the CIE coordination is (0.54, 0.31).

Example 2

Figure 3:
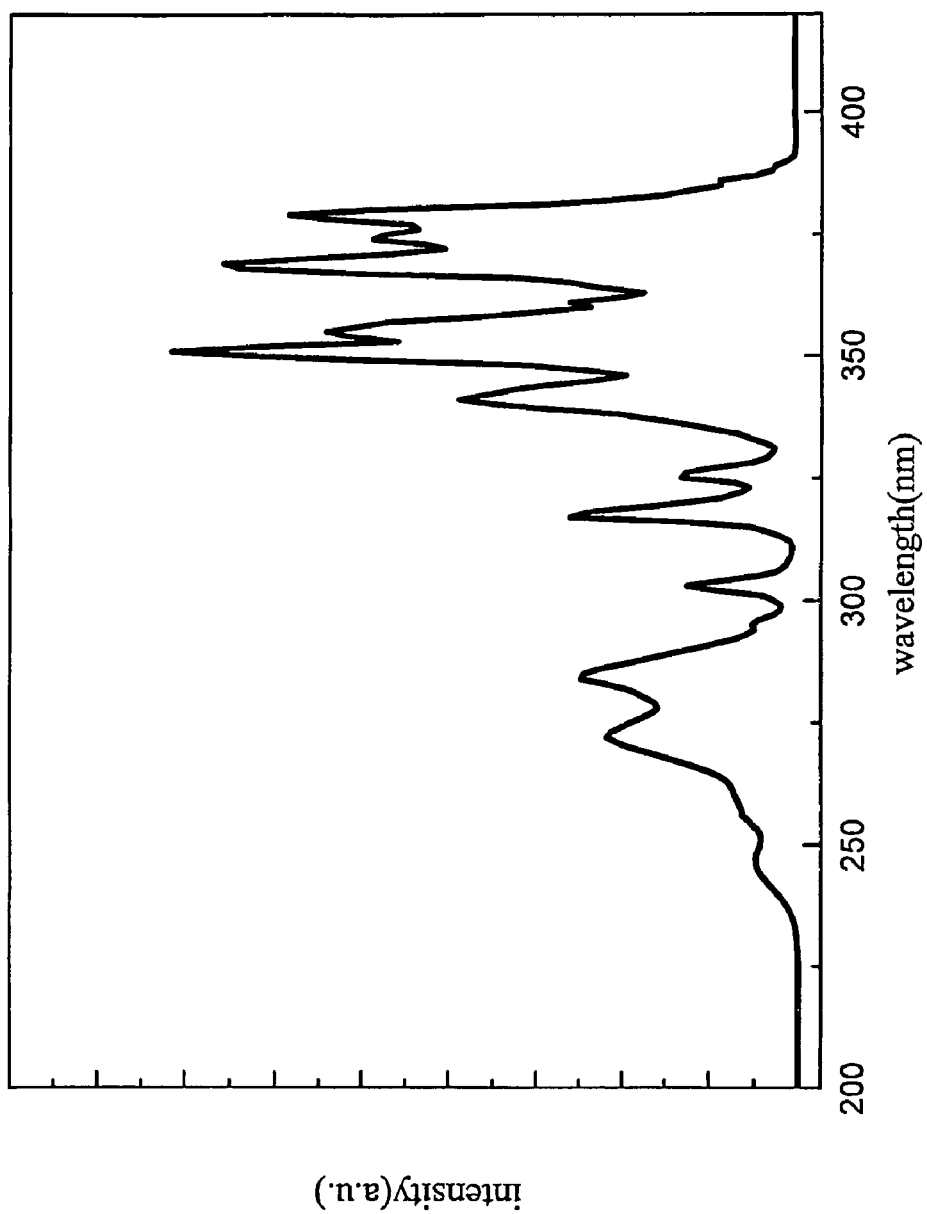
FIG. 3 is a photoluminescence excitation spectrum of the borate phosphor $Ca_{0.9}AlBO_4:Tb^{3+}_{0.1}$ in one example of the invention.
Figure 4:
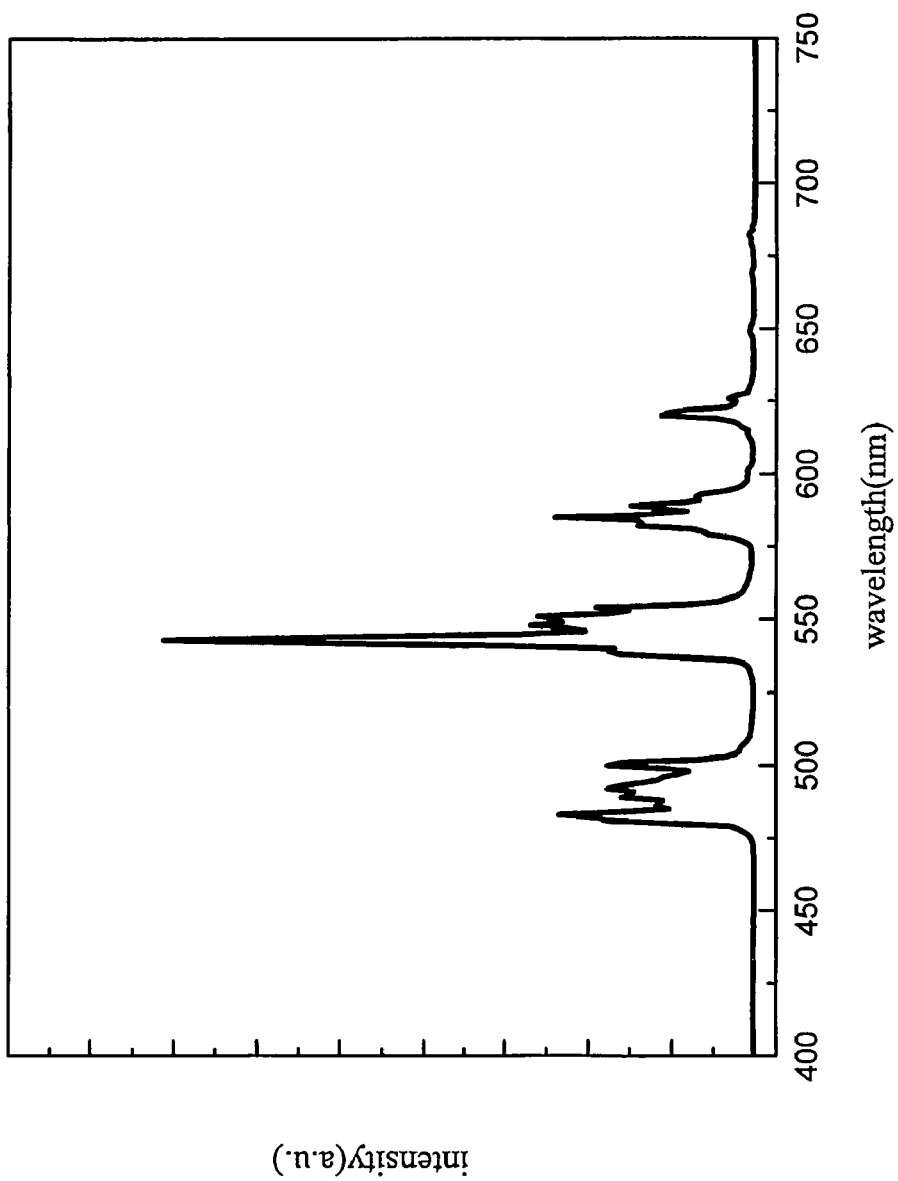
FIG. 4 is a photoluminescence emission spectrum of the borate phosphor $Ca_{0.9}AlBO_4:Tb^{3+}_{0.1}$ in one example of the invention.

0.90 mol of $CaCO_3$ (0.4504 g, FW=100.086, commercially available from ALDRICH, 99.99%), 1 mol of $Al_2O_3$ (0.2549 g, FW=101.961, commercially available from ALDRICH, 99.99%), 1 mol of $B_2O_3$ (0.1740 g, FW=69.619, commercially available from STREM, >99.9%), and 0.025 mol of $Tb_4O_7$ (0.0935 g, FW=747.713, commercially available from STREM, 99.9%) were weighted, evenly mixed and grinded, and charged in a double-crucible. The double-crucible was then stuffed by graphite, and then heated in a high temperature furnace. After sintering in air at 1000° C. for about 10 hours, washing, filtering, and heat drying, pure phase of the borate phosphor $Ca_{0.9}AlBO_4:Tb^{3+}{}_{0.1}$ was prepared. The photoluminescence excitation and emission spectra of the described product are shown in FIGS. 3 and 4, respectively. The major peak of the excitation band is 35 nm, the major peak of the emission band is 543 nm, and the CIE coordination is (0.36, 0.50).

Example 3

Figure 5:
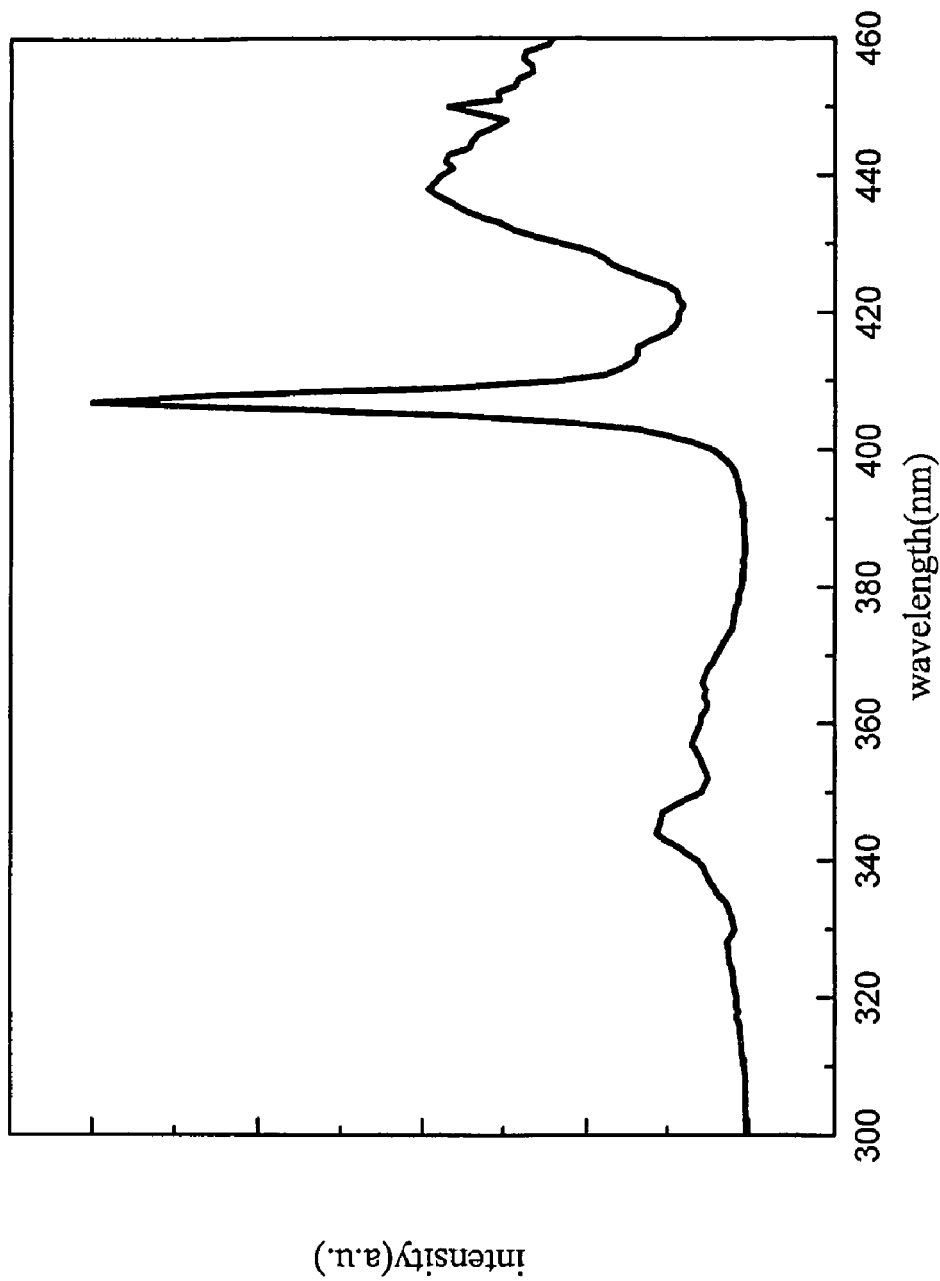
FIG. 5 is a photoluminescence excitation spectrum of the borate phosphor $Ca_{0.98}AlBO_4:Mn^{2+}_{0.02}$ in one example of the invention.
Figure 6:
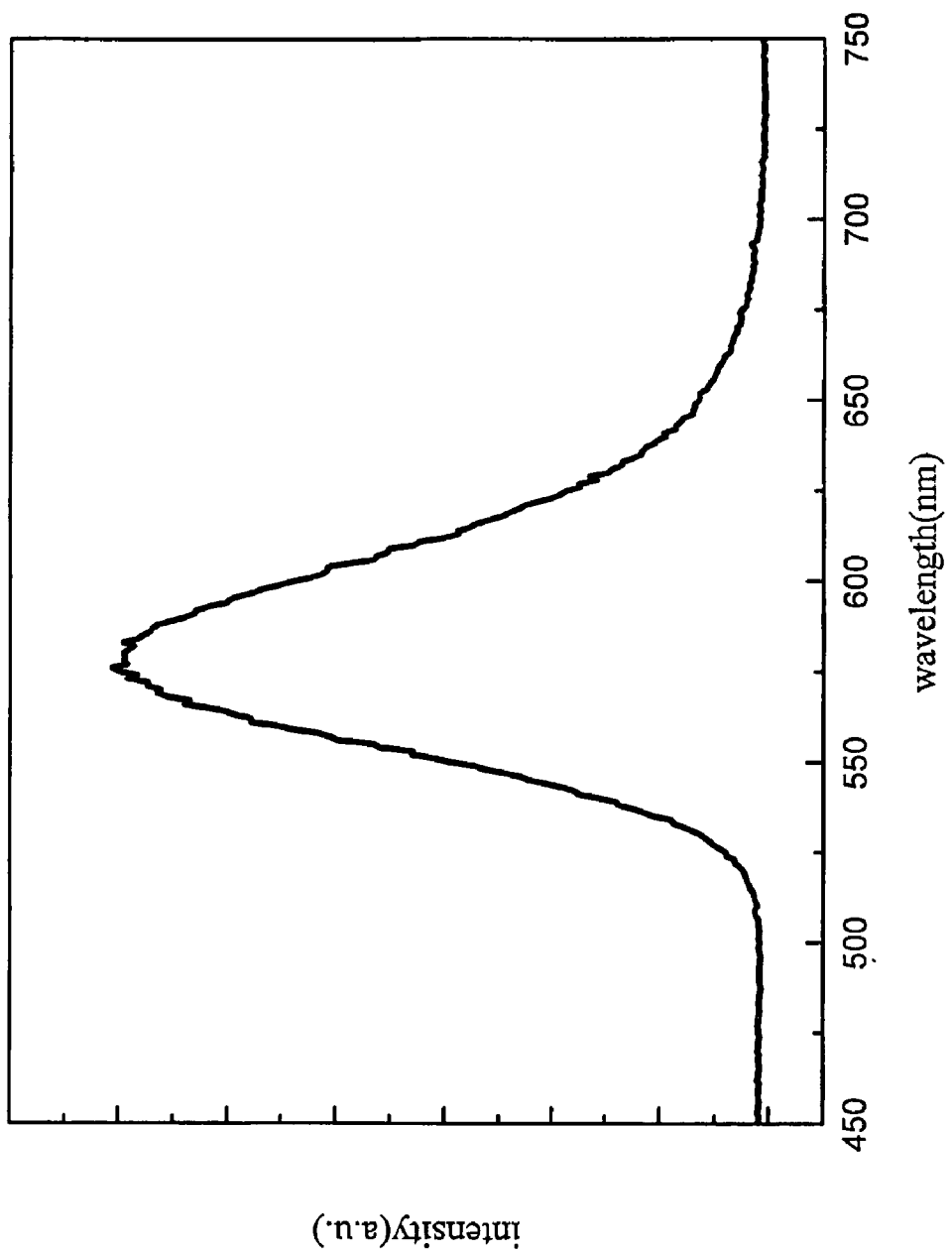
FIG. 6 is a photoluminescence emission spectrum of the borate phosphor $Ca_{0.98}AlBO_4:Mn^{2+}_{0.02}$ in one example of the invention.

0.98 mol of $CaCO_3$ (0.4904 g, FW=100.086, commercially available from ALDRICH, 99.99%), 1 mol of $Al_2O_3$ (0.2549 g, FW=101.961, commercially available from ALDRICH, 99.99%), 1 mol of $B_2O_3$ (0.1740 g, FW=69.619, commercially available from STREM, >99.9%), and 0.02 mol of MnO (0.0071 g, FW=70.937, commercially available from ALDRICH, 99.99+%) were weighted, evenly mixed and grinded, and charged in a double-crucible. The double-crucible was then stuffed by graphite, and then heated in a high temperature furnace. After sintering in air at 1000° C. for about 10 hours, washing, filtering, and heat drying, pure phase of the borate phosphor $Ca_{0.98}AlBO_4:Mn^{2+}{}_{0.02}$ was prepared. The photoluminescence excitation and emission spectra of the described product are shown in FIGS. 5 and 6, respectively. The major peak of the excitation band is 407 nm, the major peak of the emission band is 578 nm, and the CIE coordination is (0.43, 0.41).

Example 4

Figure 7:
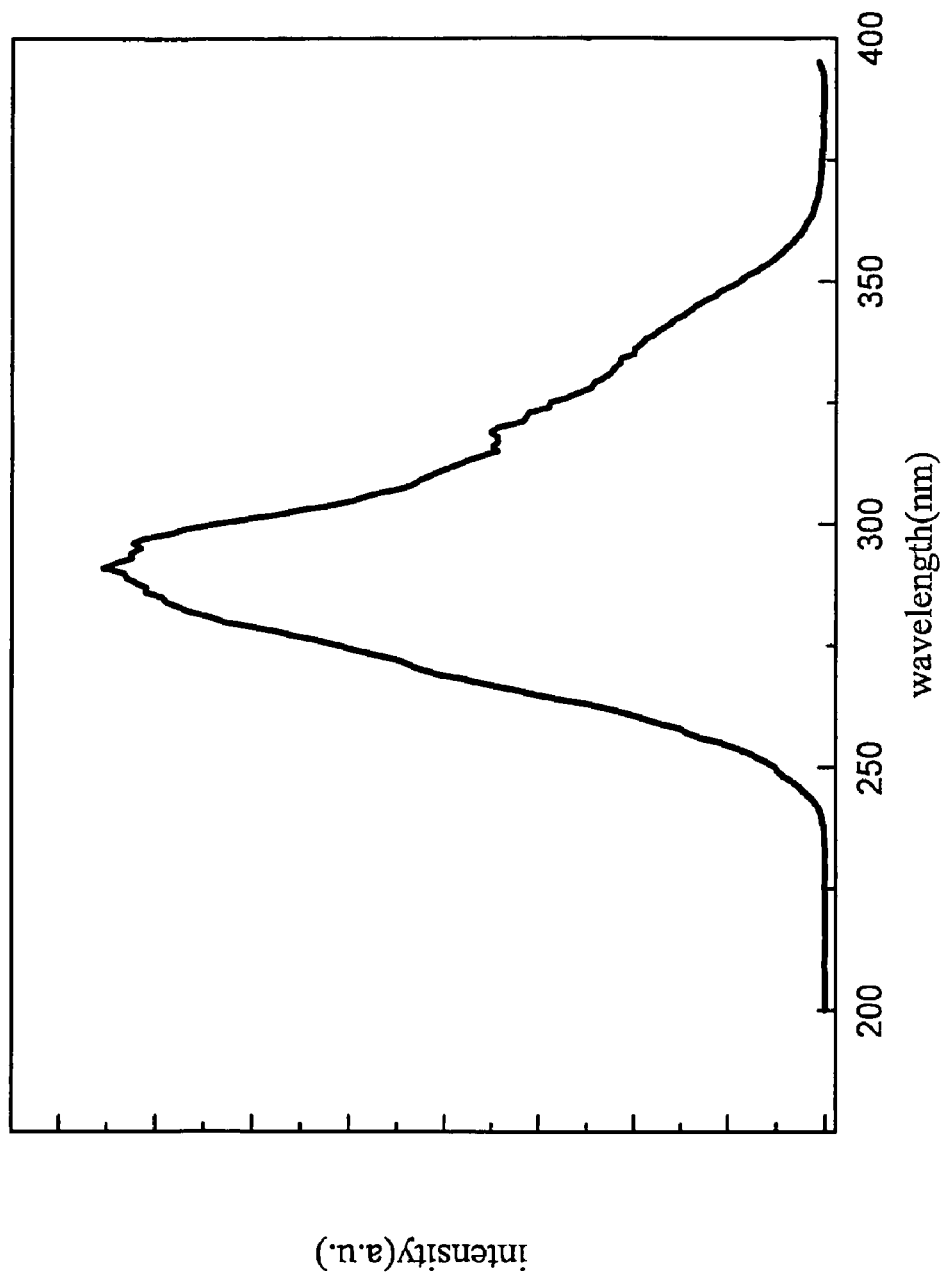
FIG. 7 is a photoluminescence excitation spectrum of the borate phosphor $Ca_{0.98}AlBO_4:Eu^{2+}_{0.02}$ in one example of the invention.
Figure 8:
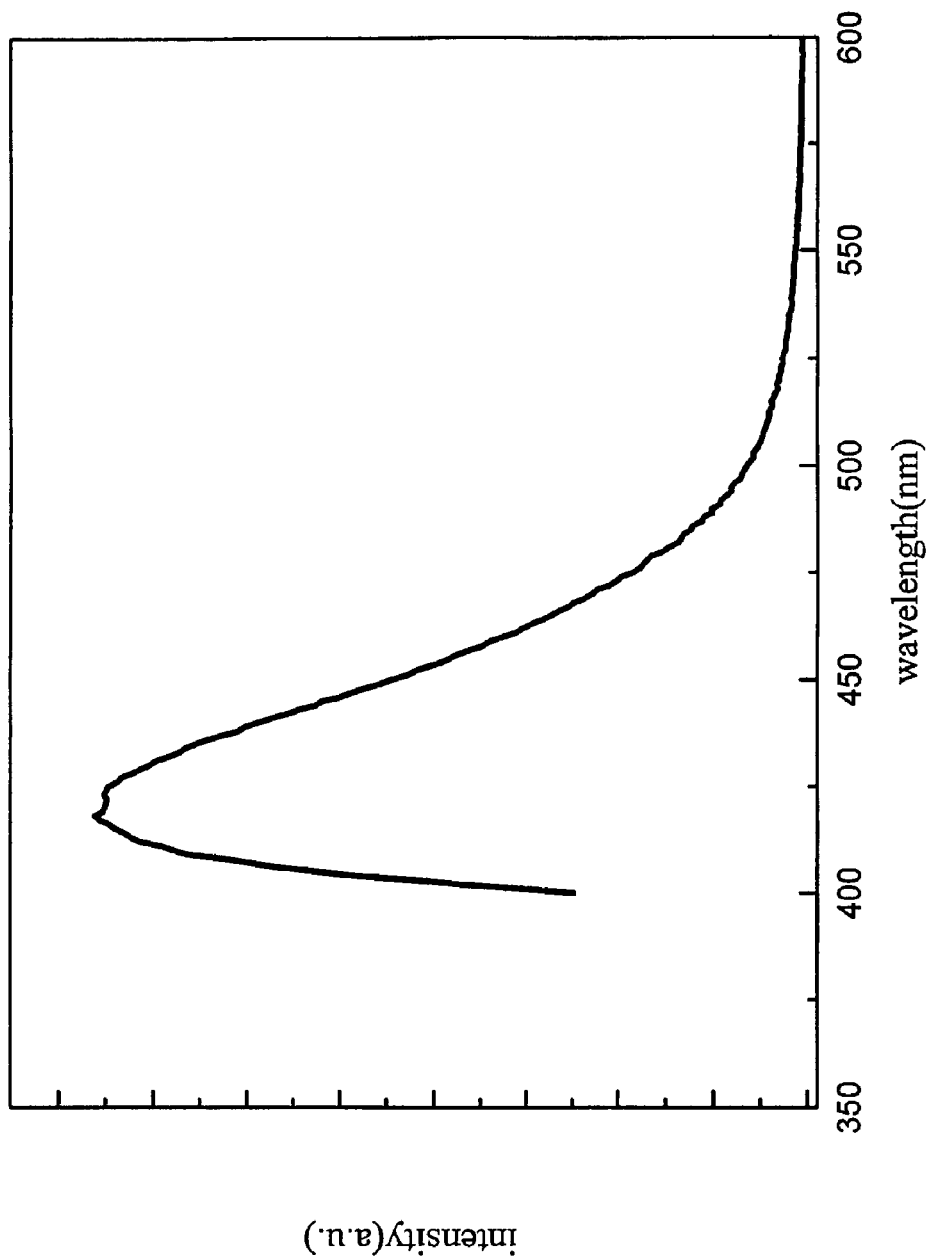
FIG. 8 is a photoluminescence emission spectrum of the borate phosphor $Ca_{0.98}AlBO_4:Eu^{2+}_{0.02}$ in one example of the invention.

0.98 mol of $CaCO_3$ (0.4904 g, FW=100.086, commercially available from ALDRICH, 99.99%), 1 mol of $Al_2O_3$ (0.2549 g, FW=101.961, commercially available from ALDRICH, 99.99%), 1 mol of $B_2O_3$ (0.1740 g, FW=69.619, commercially available from STREM, >99.9%), and 0.01 mol of $Eu_2O_3$ (0.0176 g, FW=351.917, commercially available from ALDRICH, 99.9%) were weighted, evenly mixed and grinded, and charged in a double-crucible. The double-crucible was then stuffed by graphite, and then heated in a high temperature furnace. After sintering in reductive atmosphere (10% $H_2$/90% $N_2$) at 1000° C. for about 10 hours, washing, filtering, and heat drying, pure phase of the borate phosphor $Ca_{0.98}AlBO_4:Eu^{2+}_{0.02}$ was prepared. The photoluminescence excitation and emission spectra of the described product are shown in FIGS. 7 and 8, respectively. The major peak of the excitation band is 291 nm, the major peak of the emission band is 420 nm, and the CIE coordination is (0.16, 0.03).

Example 5

Figure 9:
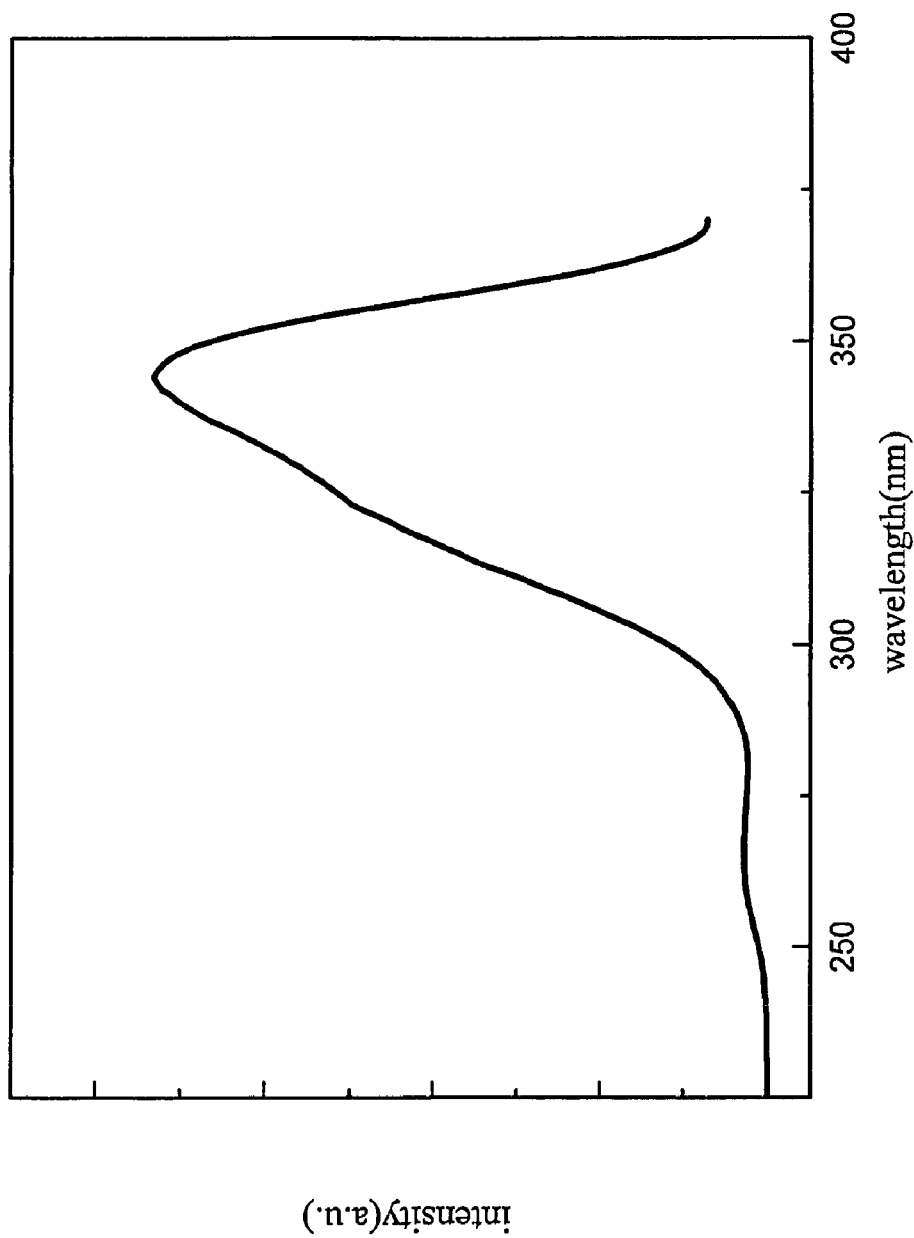
FIG. 9 is a photoluminescence excitation spectrum of the borate phosphor $Ca_{0.98}AlBO_4:Ce^{3+}_{0.02}$ in one example of the invention.
Figure 10:
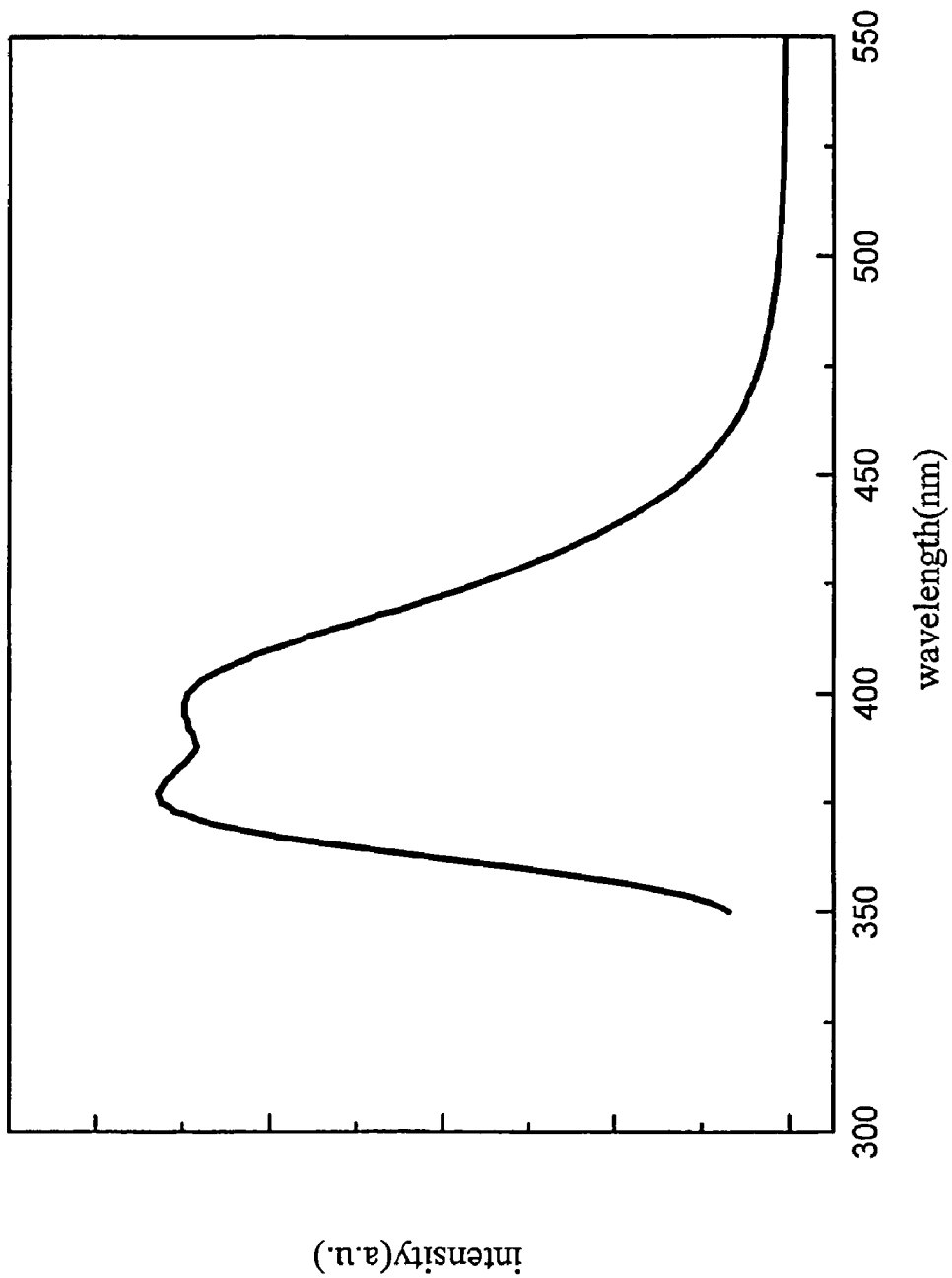
FIG. 10 is a photoluminescence emission spectrum of the borate phosphor $Ca_{0.98}AlBO_4:Ce^{3+}_{0.02}$ in one example of the invention.

0.98 mol of $CaCO_3$ (0.4904 g, FW=100.086, commercially available from ALDRICH, 99.99%), 1 mol of $Al_2O_3$ (0.2549 g, FW=101.961, commercially available from ALDRICH, 99.99%), 1 mol of $B_2O_3$ (0.1740 g, FW=69.619, commercially available from STREM, >99.9%), and 0.02 mol of $CeO_2$ (0.0172 g, FW=172.118, commercially available from STREM, 99.99%) were weighted, evenly mixed and grinded, and charged in a double-crucible. The double-crucible was then stuffed by graphite, and then heated in a high temperature furnace. After sintering in air at 1000° C. for about 10 hours, washing, filtering, and heat drying, pure phase of the borate phosphor $Ca_{0.98}AlBO_4:Ce^{3+}_{0.02}$ was prepared. The photoluminescence excitation and emission spectra of the described product are shown in FIGS. 9 and 10, respectively. The major peak of the excitation band is 344 nm, the major peak of the emission band is 377 nm, and the CIE coordination is (0.16, 0.04).

Example 6

Figure 11:
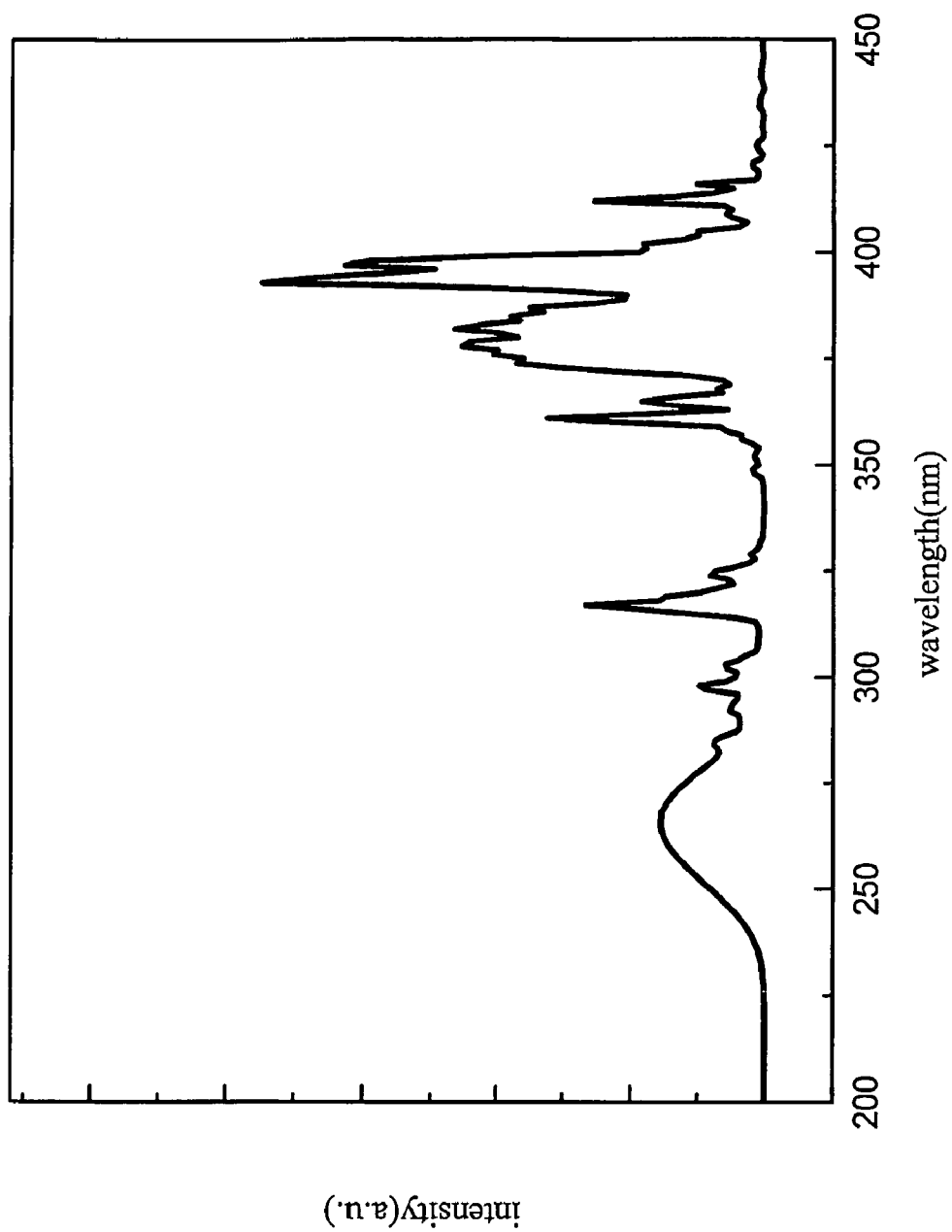
FIG. 11 is a photoluminescence excitation spectrum of the borate phosphor $Zn_{0.9}B_2O_4:Eu^{3+}_{0.1}$ in one example of the invention.
Figure 12:
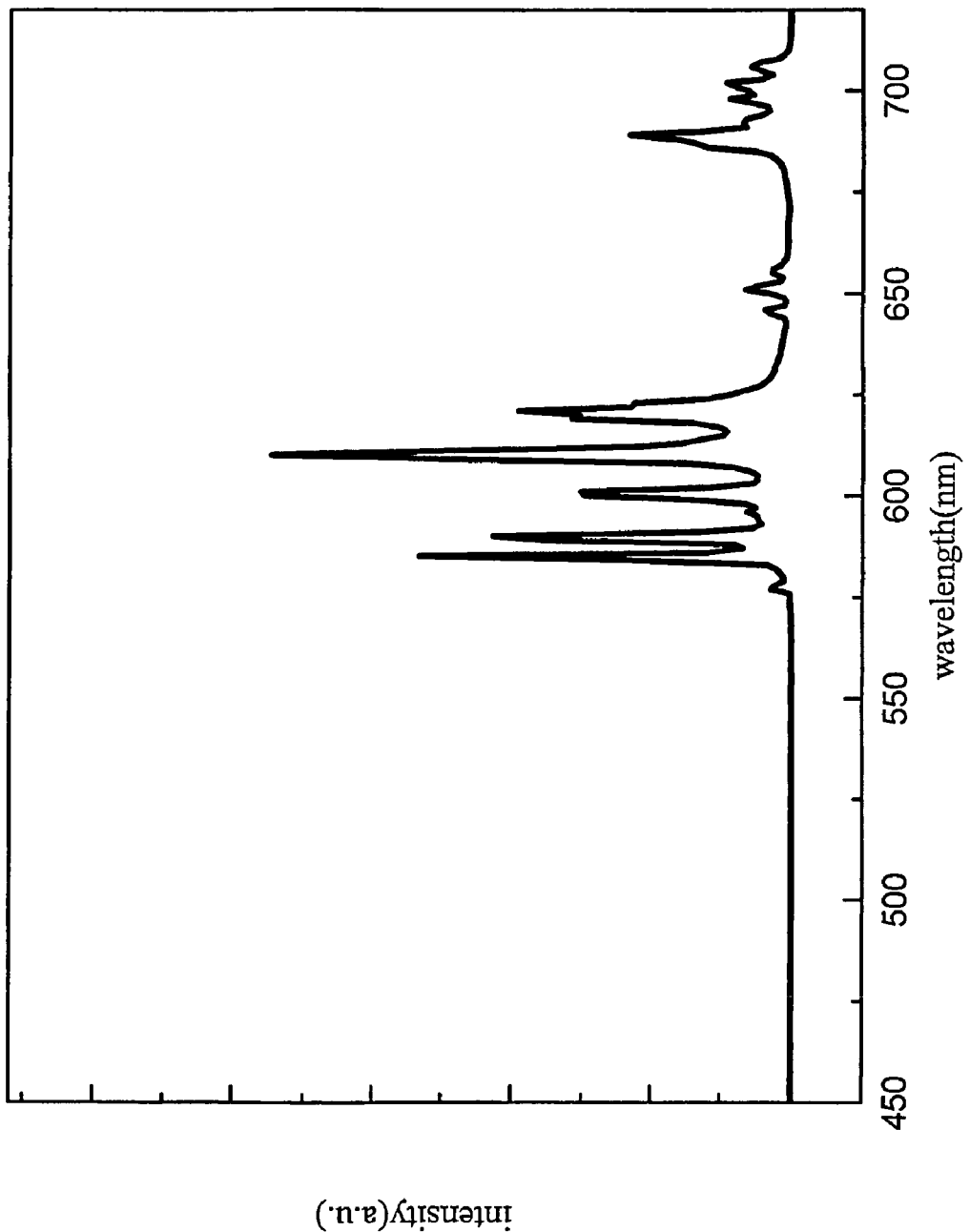
FIG. 12 is a photoluminescence emission spectrum of the borate phosphor $Zn_{0.9}B_2O_4:Eu^{3+}_{0.1}$ in one example of the invention.

0.9 mol of ZnO (0.4504 g, FW=81.389, commercially available from ACROS, 99.99%), 2 mol of $H_3BO_3$ (0.6193 g, FW=61.932, commercially available from STREM, 99.9995%), and 0.05 mol of $Eu_2O_3$ (0.0880 g, FW=351.917, commercially available from ALDRICH, 99.9%) were weighted, evenly mixed and grinded, and charged in a double-crucible. The double-crucible was then stuffed by graphite, and then heated in a high temperature furnace. After sintering in air at 850° C. for about 10 hours, washing, filtering, and heat drying, pure phase of the borate phosphor $Zn_{0.9}B_2O_4:Eu^{3+}_{0.1}$ was prepared. The photoluminescence excitation and emission spectra of the described product are shown in FIGS. 11 and 12, respectively. The major peak of the excitation band is 393 nm, the major peak of the emission band is 610 nm, and the CIE coordination is (0.62, 0.35).

Example 7

Figure 13:
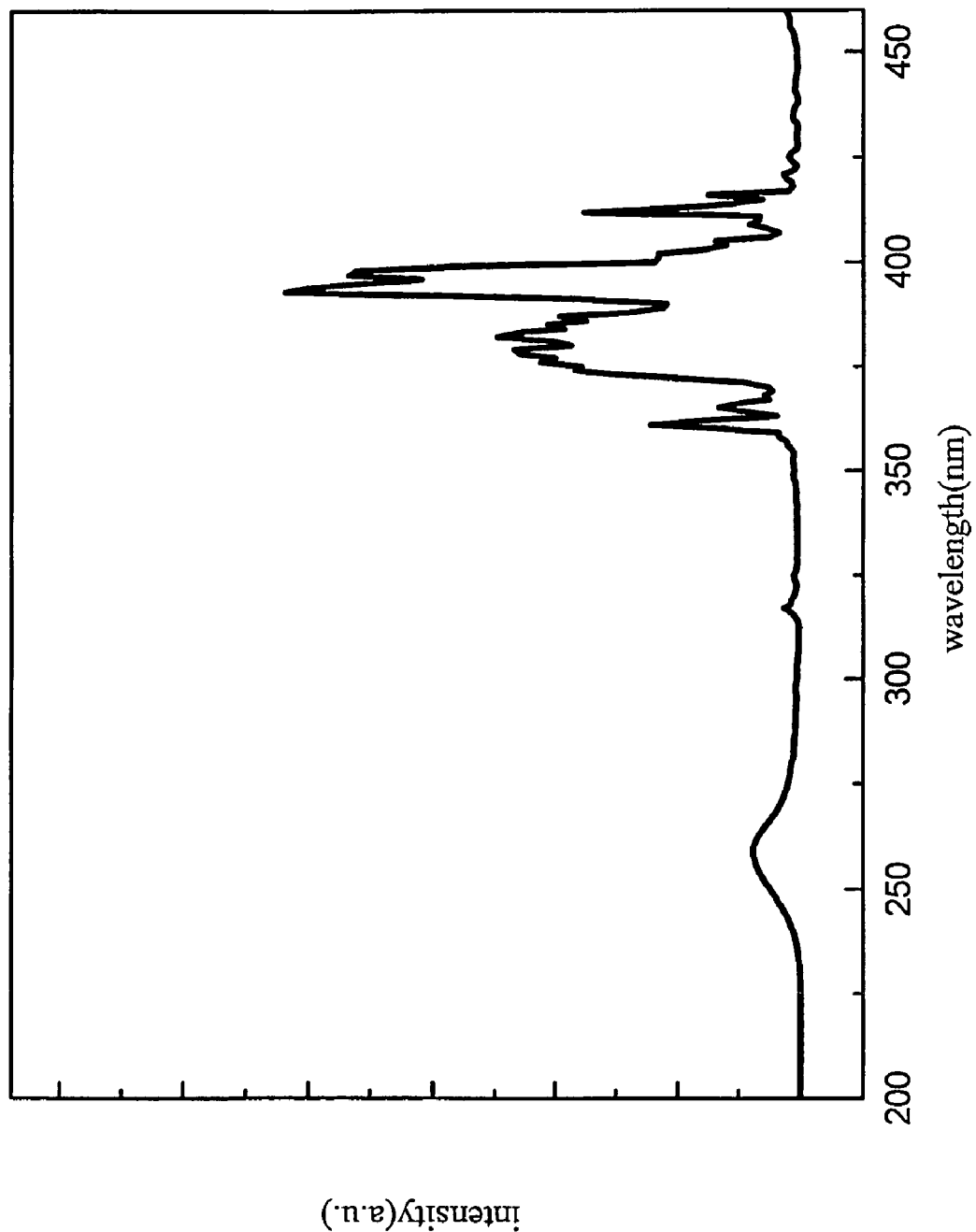
FIG. 13 is a photoluminescence excitation spectrum of the borate phosphor $Zn_{0.8}B_2O_4:Eu^{3+}_{0.1}$, $Bi^{3+}_{0.1}$ in one example of the invention.
Figure 14:
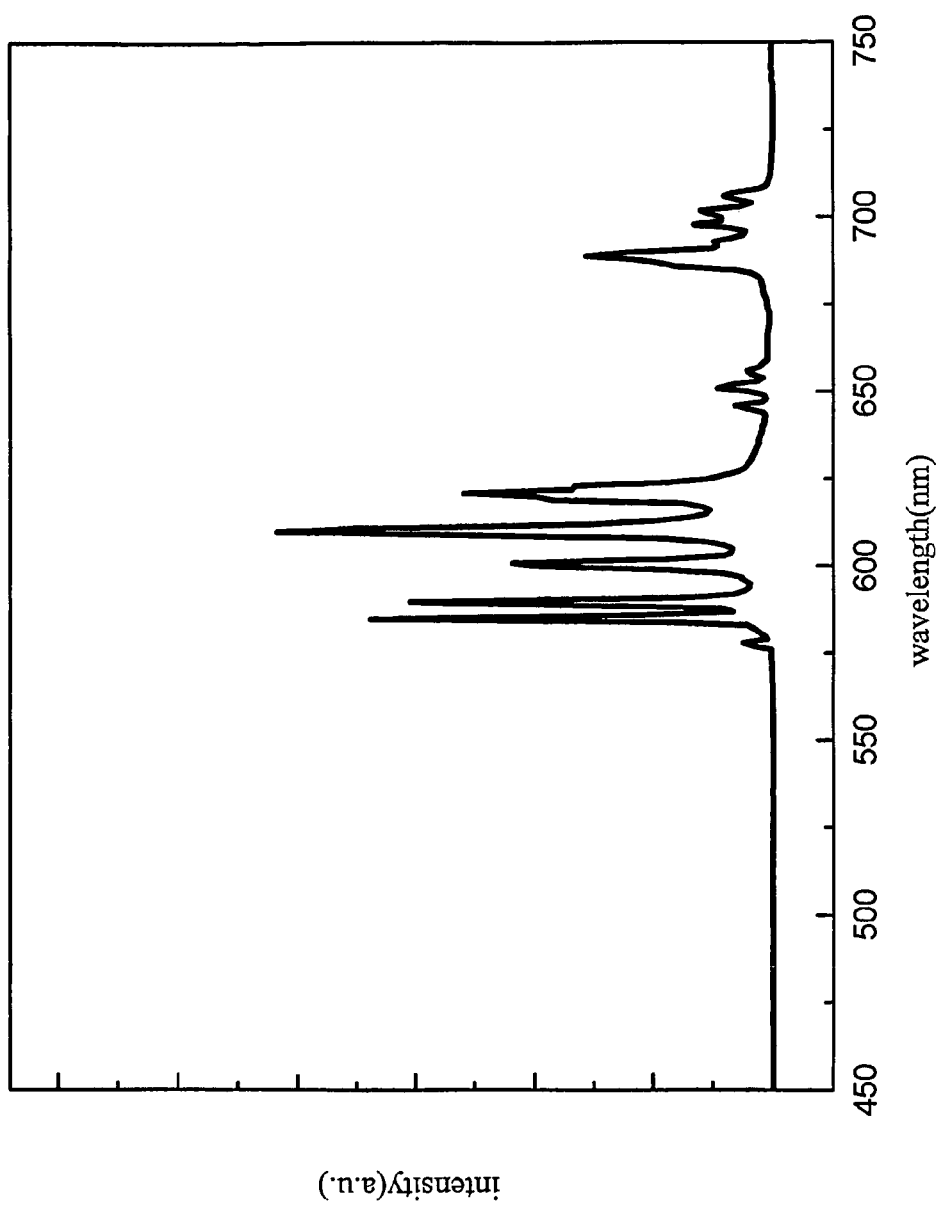
FIG. 14 is a photoluminescence emission spectrum of the borate phosphor $Zn_{0.8}B_2O_4:Eu^{3+}_{0.1}$, $Bi^{3+}_{0.1}$ in one example of the invention.

0.8 mol of ZnO (0.3256 g, FW=81.389, commercially available from ACROS, 99.99%), 2 mol of $H_3BO_3$ (0.6193 g, FW=61.932, commercially available from STREM, 99.9995%), 0.05 mol of $Eu_2O_3$ (0.0880 g, FW=351.917, commercially available from ALDRICH, 99.9%), and 0.05 mol of $Bi_2O_3$ (0.1165 g, FW=465.957, commercially available from STREM, 99.999%) were weighted, evenly mixed and grinded, and charged in a double-crucible. The double-crucible was then stuffed by graphite, and then heated in a high temperature furnace. After sintering in air at 850° C. for about 10 hours, washing, filtering, and heat drying, pure phase of the borate phosphor $Zn_{0.8}B_2O_4:Eu^{3+}_{0.1},Bi^{3+}_{0.1}$ was prepared. The photoluminescence excitation and emission spectra of the described product are shown in FIGS. 13 and 14, respectively. The major peak of the excitation band is 393 nm, the major peak of the emission band is 610 nm, and the CIE coordination is (0.63, 0.36).

Example 8

Figure 15:
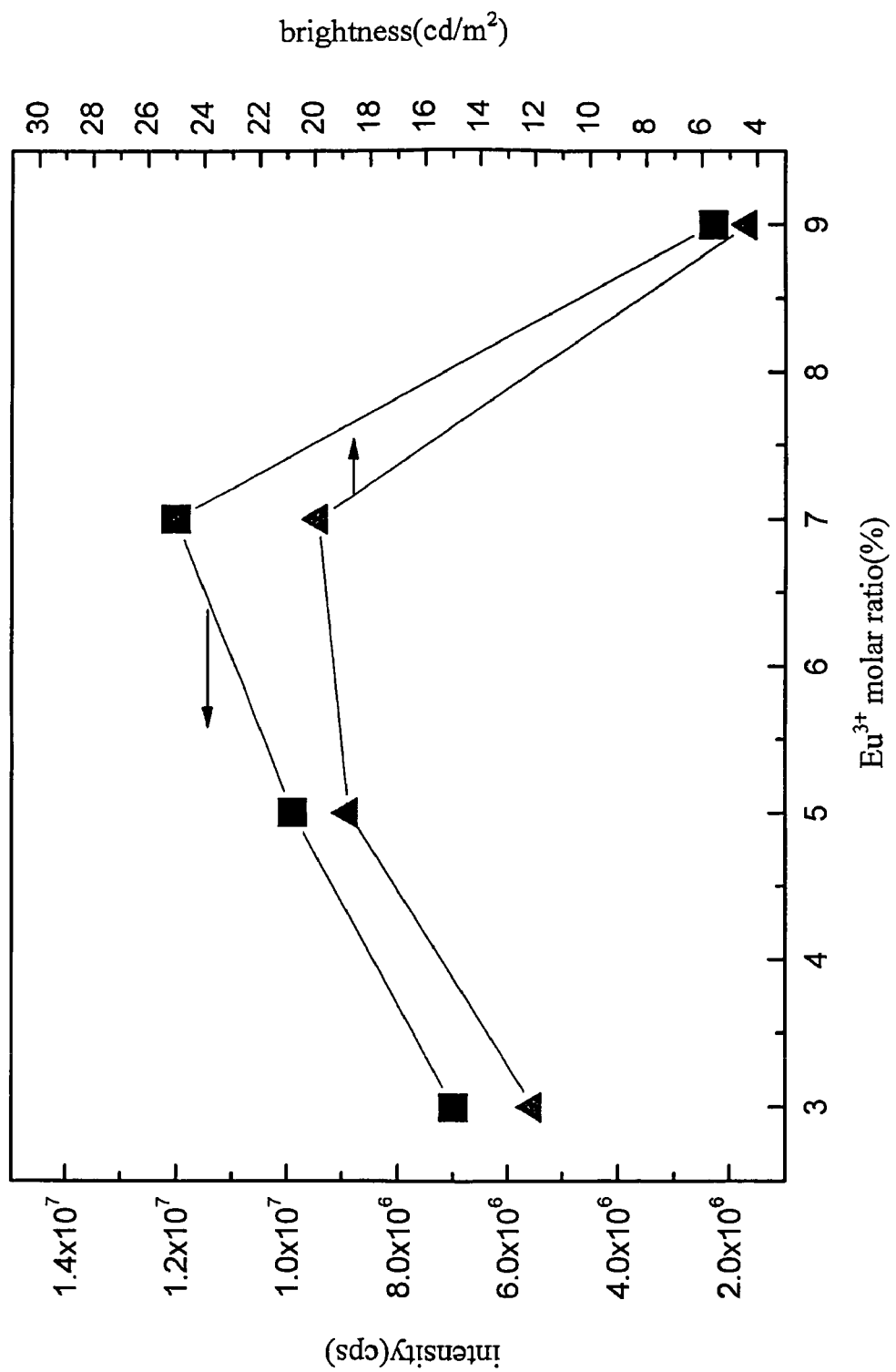
FIG. 15 is a comparison of photoluminescence intensity and brightness of $Ca_{1-x}AlBO_4:Eu^{3+}_x$ with different x ratios in one example of the invention.
Figure 16:
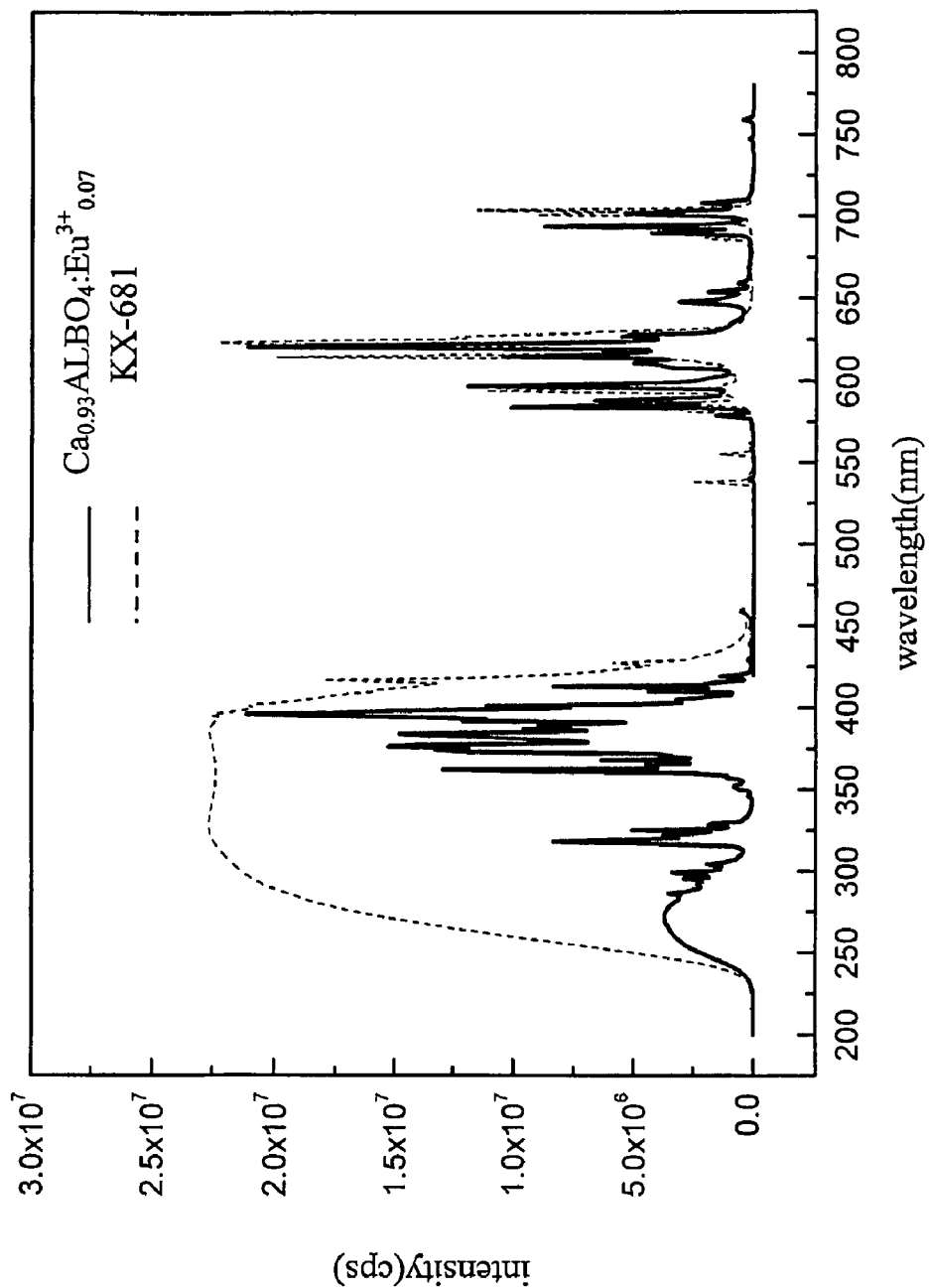
FIG. 16 is a comparison of the photoluminescence spectrum between the borate phosphor $Ca_{0.93}AlBO_4:Eu^{3+}_{0.07}$ and Kasei KX681 in one example of the invention.

Similar to Example 1, appropriate stoichiometry of $CaCO_3$, $Al_2O_3$, $B_2O_3$, and $Eu_2O_3$ were weighted, evenly mixed and grinded, and charged in a double-crucible. The double-crucible was then stuffed by graphite, and then heated in a high temperature furnace. After sintering in air at 1000° C. for about 10 hours, washing, filtering, and heat drying, pure phase of the borate phosphors $Ca_{1-x}AlBO_4:Eu^{3+}_x$ with different x ratios were prepared. FIG. 15 shows a comparison of photoluminescence intensity and brightness of $Ca_{1-x}AlBO_4:Eu^{3+}_x$ with different x ratios (x=0.03, 0.05, 0.07, and 0.09). When x is 0.07 (Example 1), the borate phosphor has the strongest emission brightness and photoluminescence emission intensity. Comparing with the Kasei KX681 ($Y_2O_2S:Eu^{3+}$, CIE coordination (0.66, 0.33), commercially available from Kasei), the borate phosphor $Ca_{0.93}AlBO_4:Eu^{3+}_{0.07}$ in Example 1 has similar photoluminescence emission intensity and better color saturation. The comparison of the photoluminescence spectrum between the borate phosphor $Ca_{0.93}AlBO_4:Eu^{3+}_{0.07}$ and KX681 is shown in FIG. 16. The photoluminescence emission intensity of the borate phosphor $Ca_{0.93}AlBO_4:Eu^{3+}_{0.07}$ reached 95% photoluminescence emission intensity of KX681. The photoluminescence emission integral area of the borate phosphor $Ca_{0.93}AlBO_4:Eu^{3+}_{0.07}$ reached 96% photoluminescence emission integral area of KX681.

Example 9

Figure 17:
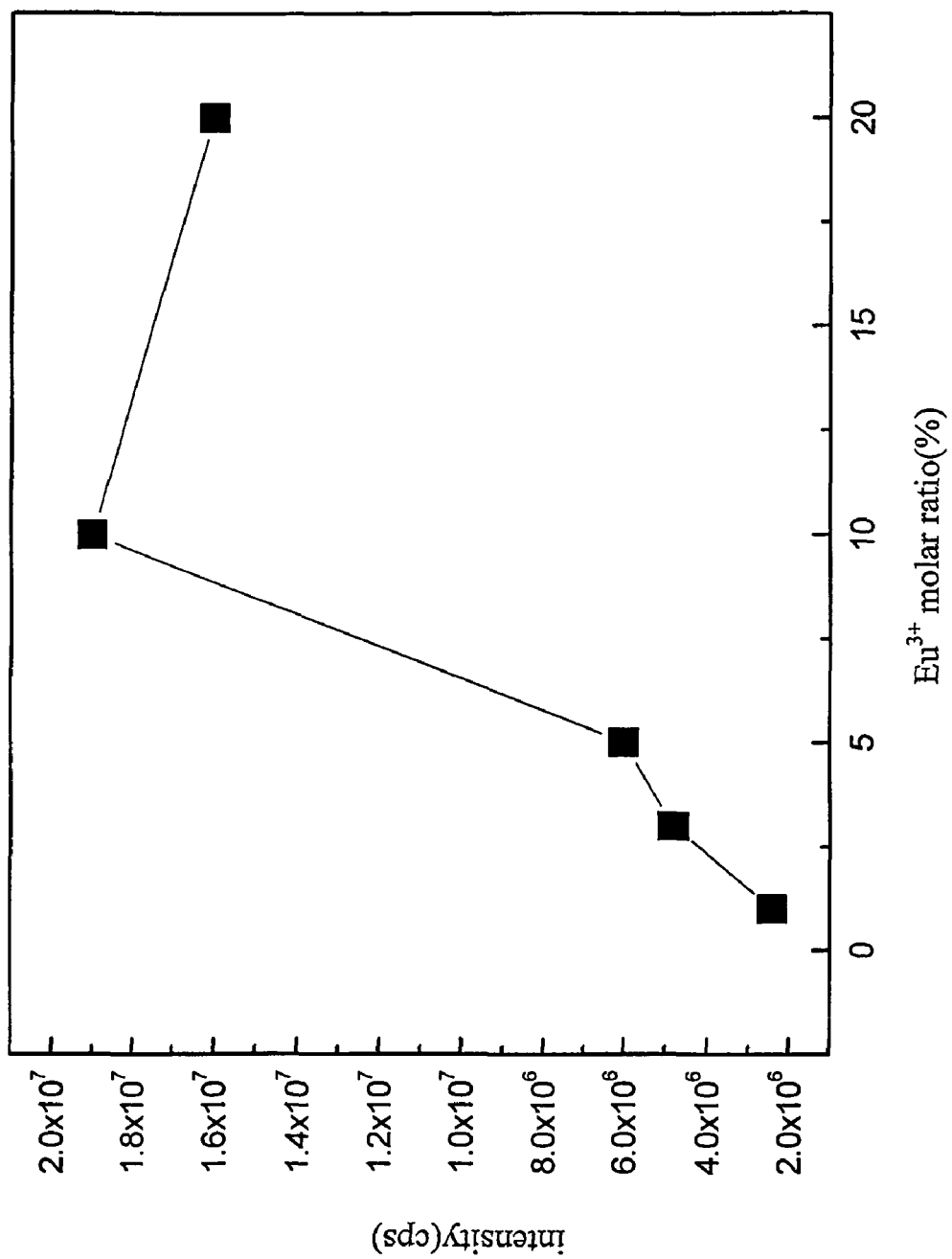
FIG. 17 is a comparison of photoluminescence intensity of $Zn_{1-x}B_2O_4:Eu^{3+}_x$ with different x ratios in one example of the invention.
Figure 18:
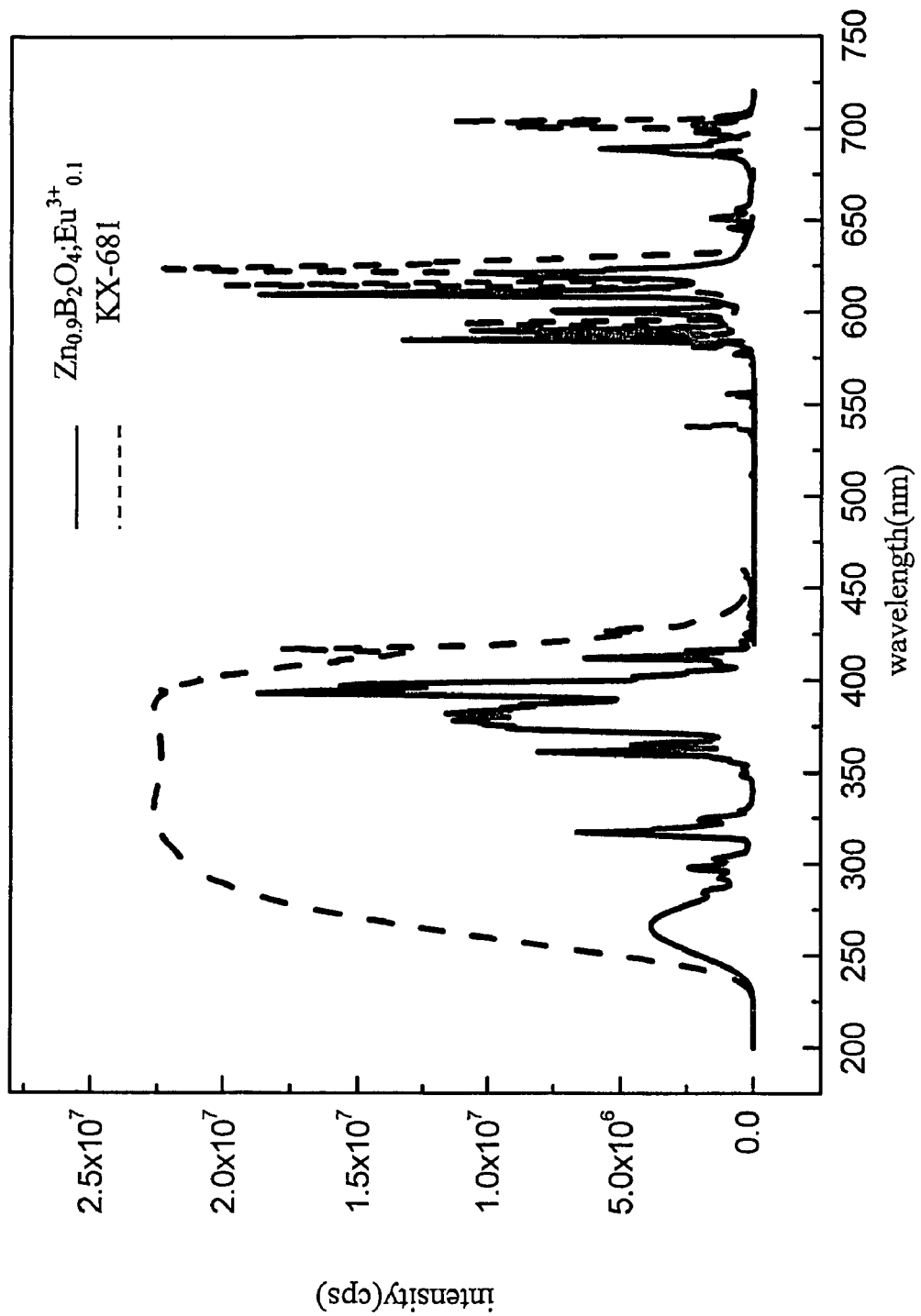
FIG. 18 is a comparison of the photoluminescence spectrum between the borate phosphor $Zn_{0.9}B_2O_4:Eu^{3+}_{0.1}$ and Kasei KX681 in one example of the invention.

Similar to Example 6, appropriate stoichiometry of ZnO, $H_3BO_3$, and $Eu_2O_3$ were weighted, evenly mixed and grinded, and charged in a double-crucible. The double-crucible was then stuffed by graphite, and then heated in a high temperature furnace. After sintering in air at 850° C. for about 10 hours, washing, filtering, and heat drying, pure phase of the borate phosphors $Zn_{1-x}B_2O_4:Eu^{3+}_x$ with different x ratios were prepared. FIG. 17 shows a comparison of photoluminescence intensity of $Zn_{1-x}B_2O_4:Eu^{3+}_x$ with different x ratios (x=0.01, 0.03, 0.05, 0.1, and 0.2). When x is 0.1 (Example 6), the borate phosphor has the strongest photoluminescence emission intensity. Comparing with the Kasei KX681, the borate phosphor $Zn_{0.9}B_2O_4:Eu^{3+}_{0.1}$ in Example 6 has similar photoluminescence emission intensity and better color saturation. The comparison of the photoluminescence spectrum between the borate phosphor $Zn_{0.9}B_2O_4:Eu^{3+}_{0.1}$ and KX681 is shown in FIG. 18. The photoluminescence emission intensity of the borate phosphor $Zn_{0.9}B_2O_4:Eu^{3+}_{0.1}$ reached 83% photoluminescence emission intensity of KX681. The photoluminescence emission integral area of the borate phosphor $Zn_{0.9}B_2O_4:Eu^{3+}_{0.1}$ reached 80% photoluminescence emission integral area of KX681.

Example 10

Figure 19:
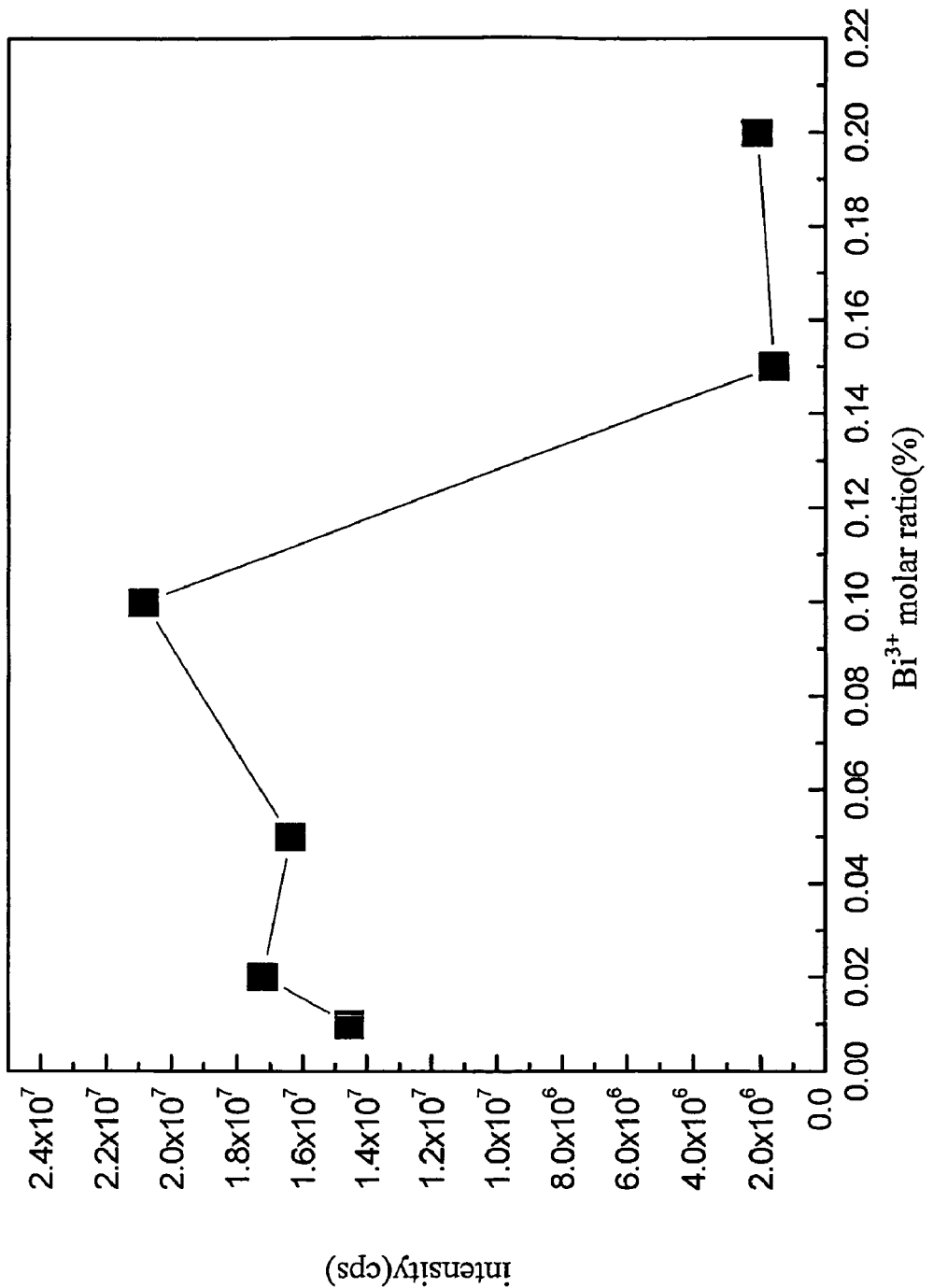
FIG. 19 is a comparison of photoluminescence intensity of $Zn_{0.9-y}B_2O_4:Eu^{3+}_{0.1}$, $Bi^{3+}_y$ with different y ratios in one example of the invention.
Figure 20:
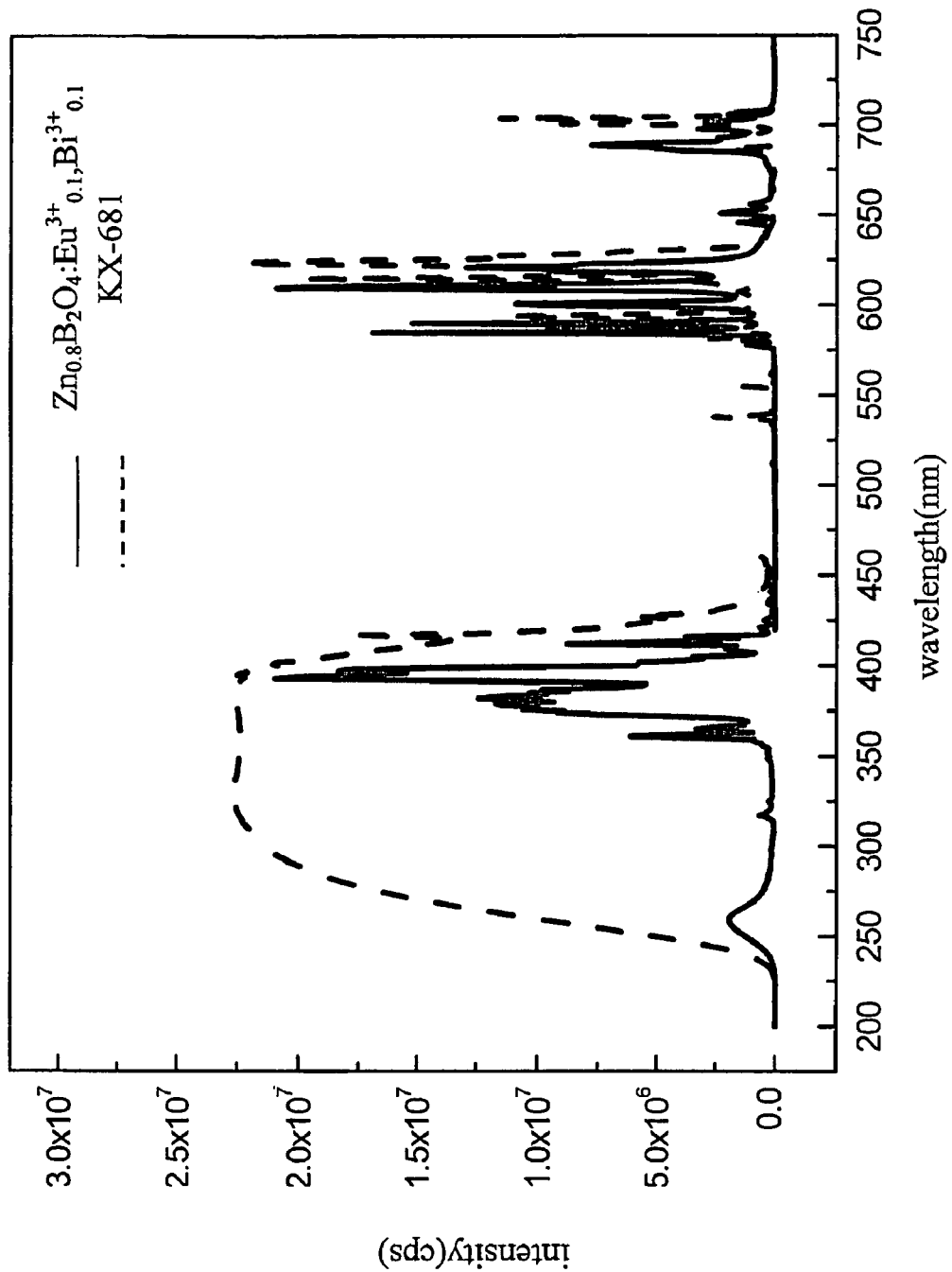
FIG. 20 is a comparison of the photoluminescence spectrum between the borate phosphor $Zn_{0.9-y}B_2O_4:Eu^{3+}_{0.1}$, $Bi^{3+}_{0.1}$ and Kasei KX681 in one example of the invention.

Similar to Example 7, appropriate stoichiometry of ZnO, $H_3BO_3$, $Eu_2O_3$, and $Bi_2O_3$ were weighted, evenly mixed and grinded, and charged in a double-crucible. The double-crucible was then stuffed by graphite, and then heated in a high temperature furnace. After sintering in air at 850° C. for about 10 hours, washing, filtering, and heat drying, pure phase of the borate phosphors $Zn_{0.9-y}B_2O_4:Eu^{3+}_{0.1}$, $Bi^{3+}_y$ with different y ratios were prepared. FIG. 19 shows a comparison of photoluminescence intensity of $Zn_{0.9-y}B_2O_4:Eu^{3+}_{0.1}$, $Bi^{3+}_y$ with different y ratios (y=0.01, 0.02, 0.05, 0.1, 0.15, and 0.2). When y is 0.1 (Example 7), the borate phosphor has the strongest photoluminescence emission intensity. Comparing with the Kasei KX681, the borate phosphor $Zn_{0.8}B_2O_4:Eu^{3+}_{0.1}$, $Bi^{3+}_{0.1}$ in Example 7 has similar photoluminescence emission intensity and better color saturation. The comparison of the photoluminescence spectrum between the borate phosphor $Zn_{0.8}B_2O_4:Eu^{3+}_{0.1}$, $Bi^{3+}_{0.1}$ and KX681 is shown in FIG. 20. The photoluminescence emission intensity of the borate phosphor $Zn_{0.8}B_2O_4:Eu^{3+}_{0.1}$, $Bi^{3+}_{0.1}$ reached 94% photoluminescence emission intensity of KX681. The photoluminescence emission integral area of the borate phosphor $Zn_{0.8}B_2O_4:Eu^{3+}_{0.1}$, $Bi^{3+}_{0.1}$ reached 104% photoluminescence emission integral area of KX681.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A white light illumination device, comprising the borate phosphor having a formula:

$Ca_{1-x}AlBO_4:M_x$, wherein M is $Pr^{3+}$, $Nd^{3+}$, $Eu^{3+}$, $Eu^{2+}$, $Gd^{3+}$, $Tb^{3+}$, $Ce^{3+}$, $Dy^{3+}$, $Yb^{2+}$, $Er^{3+}$, $Sc^{3+}$, $Mn^{2+}$, $Zn^{2+}$, or combinations thereof; and $0 \leq x \leq 0.3$; and an excitation light source, wherein the excitation light source emits 200-400 nm UV or 400-470 nm blue light.

2. The white light illumination device as claimed in claim 1, wherein the excitation light source comprises a light emitting diode or a laser diode.

3. The white light illumination device as claimed in claim 1, further comprising a blue phosphor and a green phosphor.

4. The white light illumination device as claimed in claim 3, wherein the blue phosphor comprises $BaMgAl_{10}O_{17}:Eu^{2+}$, $(Ba,Sr,Ca)_5(PO_4)_3(F, Cl, Br, OH):Eu^{2+}$, $2SrO*0.84P_2O_5*0.16B_2O_3:Eu^{2+}$, $Sr_2Si_3O_8*2SrCl_2:Eu^{2+}$, or $(Mg, Ca, Sr, Ba, Zn)_3B_2O_6:Eu^{2+}$.

5. The white light illumination device as claimed in claim 3, wherein the green phosphor comprises $BaMgAl_{10}O_{17}:Eu^{2+},Mn^{2+}$, $SrGa_2S_4:Eu^{2+}$, $(Ca,Sr,Ba)Al_2O_4:Eu^{2+},Mn^{2+}$, $(Ca,Sr,Ba)_4Al_{14}O_{25}:Eu^{2+}$, or $Ca_8Mg(SiO_4)_4Cl_2:Eu^{2+},Mn^{2+}$.

6. The white light illumination device as claimed in claim 1, wherein the borate phosphor comprises $Ca_{1-x}AlBO_4:Eu^{3+}_x$ $Ca_{1-x}AlBO_4:Tb^{3+}_x Ca_{1-x}AlBO_4:Mn^{2+}_x Ca_{1-x}AlBO_4:Eu^{2+}_x$ or $Ca_{1-x}AlBO_4:Ce^{3+}_x$.

7. The white light illumination device as claimed in claim 1, wherein the borate phosphor is $Ca_{0.93}AlBO_4:Eu^{3+}_{0.07}$, and the borate phosphor is excited by 200-400 nm UV or 400-470 nm blue light to emit a red light, and the red light has a major emission peak of about 621 nm and a CIE coordination of (0.54, 0.31).

8. The white light illumination device as claimed in claim 1, wherein the borate phosphor is $Ca_{0.9}AlBO_4:Tb^{3+}_{0.1}$, and the borate phosphor is excited by 200-400 nm UV or 400-470 nm blue light to emit a green light, and the green light has a major emission peak of about 543 nm and a CIE coordination of (0.36, 0.50).

9. The white light illumination device as claimed in claim 1, wherein the borate phosphor is $Ca_{0.98}AlBO_4:Mn^{2+}_{0.02}$, and the borate phosphor is excited by 200-400 nm UV or 400-470 nm blue light to emit an orange light, and the orange light has a major emission peak of about 578 nm and a CIE coordination of (0.43, 0.41).

10. The white light illumination device as claimed in claim 1, wherein the borate phosphor is $Ca_{0.98}AlBO_4:Eu^{2+}_{0.02}$, and the borate phosphor is excited by 200-400 nm UV or 400-470 nm blue light to emit a violet light, and the violet light has a major emission peak of about 420 nm and a CIE coordination of (0.16, 0.03).

11. The white light illumination device as claimed in claim 1, wherein the borate phosphor is $Ca_{0.98}AlBO_4:Ce^{3+}_{0.02}$, and the borate phosphor is excited by 200-400 nm UV or 400-470 nm blue light to emit a violet light, and the violet light has a major emission peak of about 377 nm and a CIE coordination of (0.16, 0.04).

* * * * *